United States Patent [19]
Lundin et al.

[11] 3,937,096
[45] Feb. 10, 1976

[54] MOTOR SYSTEM WITH REPLACEABLE OUTPUT SHAFT

[75] Inventors: Robert S. Lundin, Northfield; Richard K. Keutzer, Thomaston, both of Conn.

[73] Assignee: General Time Corporation, Thomaston, Conn.

[22] Filed: Dec. 30, 1974

[21] Appl. No.: 537,552

[52] U.S. Cl. ................................ 74/421 A; 74/405
[51] Int. Cl.² ...................... F16H 1/12; F16H 57/00
[58] Field of Search ....... 74/405, 421 A, 414; 64/14

[56] References Cited
UNITED STATES PATENTS

| | | | |
|---|---|---|---|
| 392,480 | 11/1888 | Whiteley et al. | 403/373 |
| 598,055 | 1/1898 | McCabe | 58/139 |
| 1,011,246 | 12/1911 | Reaves | 58/140 |
| 1,378,866 | 5/1921 | Horn | 58/139 |
| 2,146,835 | 2/1939 | Merwin | 242/68 |
| 2,497,079 | 2/1950 | Godley | 161/23 |
| 2,531,849 | 11/1950 | Karleen | 74/421 A X |
| 2,570,539 | 10/1951 | Fowler | 58/127 |
| 2,638,761 | 5/1953 | Henry | 64/11 |
| 2,642,713 | 6/1953 | Prins | 58/2 |
| 3,534,545 | 10/1970 | Oster et al. | 58/21.14 |

*Primary Examiner*—Leonard H. Gerin
*Attorney, Agent, or Firm*—Pennie & Edmonds

[57] ABSTRACT

A motor system having interchangeable modular components including a prime mover, a speed reduction unit, an output shaft and detachable electrical leads is disclosed. Various combinations of components easily may be mounted together to meet specific power input and output speed requirements as well as to provide various output shaft style configurations for driving connection with a driven member. The output shaft is releasably locked to the gear reduction unit and has means for coupling the output shaft to the output gearing.

13 Claims, 8 Drawing Figures

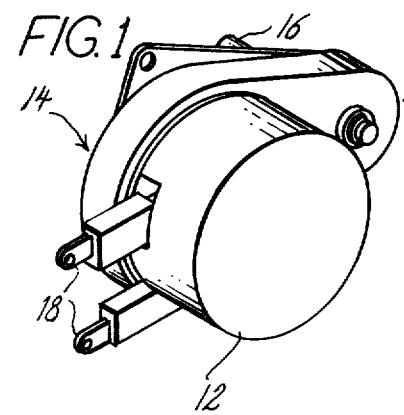
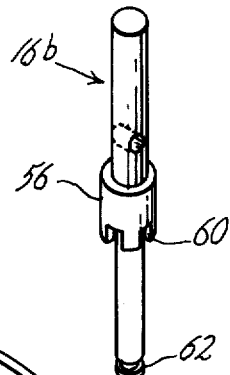
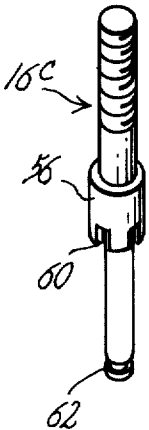
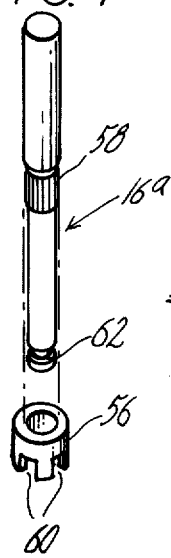
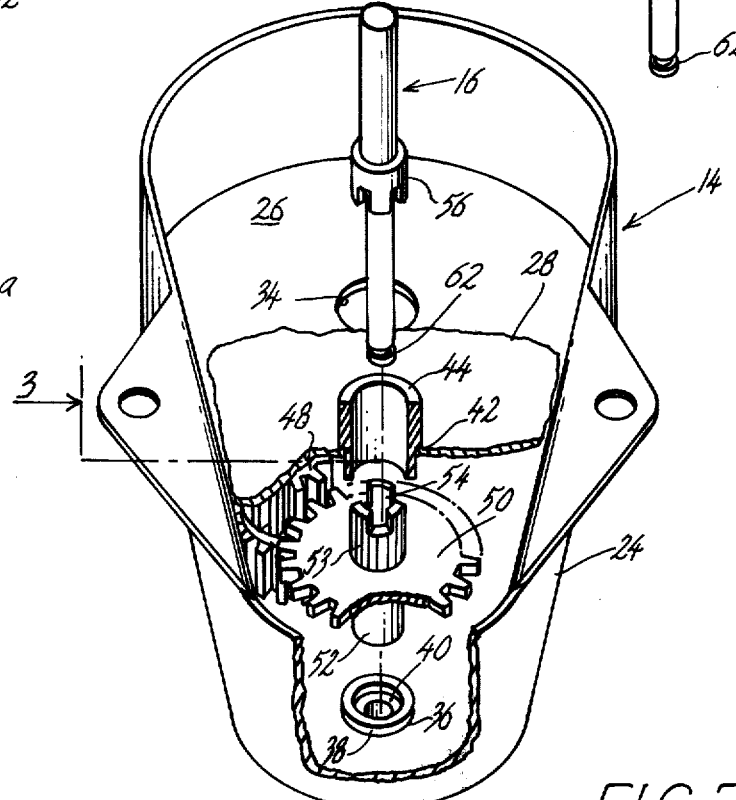
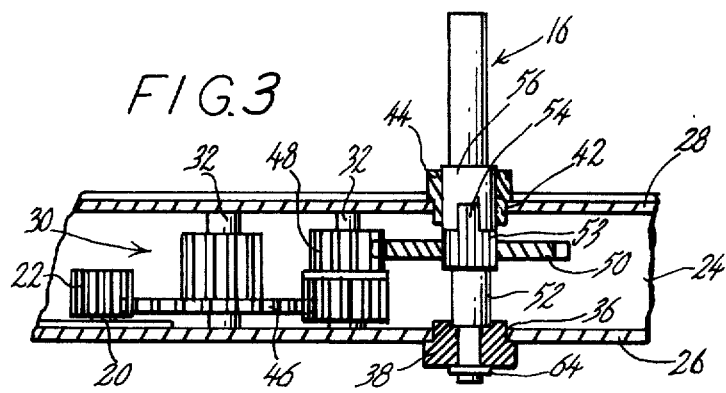
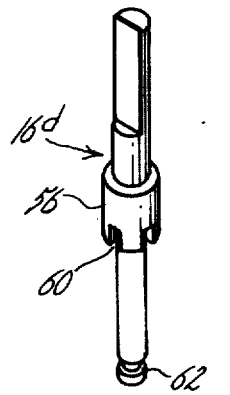
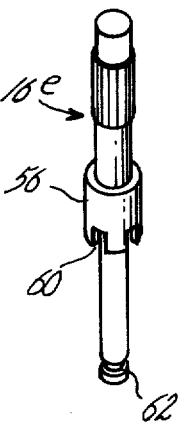

MOTOR SYSTEM WITH REPLACEABLE OUTPUT SHAFT

BACKGROUND OF THE INVENTION

In the prior art motor assemblies including a prime mover, a gear reduction unit capable through successive stepdown of supplying the desired power take-off through an output shaft, and a pair of electrical leads for applying power to the prime mover are known. Representative of such prior art teachings is U.S. Pat. No. 3,268,751 which issued in the names of Alfred M. Nebiolo and Robert S. Lundin, one of the co-inventors' herein. While the above-noted motor assembly adequately served the purposes for which it was designed and was accepted commercially it suffers in that it has a major disadvantage, namely that each of the various parts including the prime mover, the gear reduction unit, the output shaft and the electrical leads are permanently fastened together so that interchangeability of parts is difficult if not impossible. Therefore, the motor assembly is limited in application by the rating of the prime mover, the stepdown capability of the gear reduction unit, the style of the shank of the output shaft which couples to a member to be driven, and the type of electrical lead which limits placement of the motor assembly and/or the type of connector for attachment with the lead terminals.

As should be apparent with the above assembly there is a need to stock many different units to meet differing requirements for production, R & D or other uses. This need has a decided impact in inventory levels to be maintained and the costs attendant therewith. The impact is felt both by the supplier and the user of the motor assembly.

The prior art teaching of U.S. Pat. No. 3,676,725 to Wiser et al. is representative of those teachings which directed themselves to the question of interchangeability of parts of structures as outlined above. The Wiser et al. patent relates to the interchangeability of one reduction unit for another and the capability of mounting each of several gear reduction units to the prime mover.

While the Wiser et al. patent directs itself to the question of interchangeability of parts it falls short of the objective attained by the present invention. To this end, the Wiser et al. patent and other patents of like teaching provide no capability of selectively locking in an output shaft in cooperative driven relation with the gears of a gear reduction unit.

Thus, Wiser et al. is limited in use by the style configuration of the output shaft coupling means of the particular gear reduction unit to be used with the prime mover.

SUMMARY OF THE INVENTION

It is, accordingly, a primary object of the invention to provide a motor assembly including a prime mover, a gear reduction unit, as output shaft, and electrical leads, each of which may be suitably mounted for operation and replaced if other desired operational characteristics or objectives are to be met by the motor assembly.

The invention more particularly provides an output shaft having an elongated shank which is received by the motor assembly and both removed from and replaced by a second or subsequent output shaft. A connector having a cylindrical shaft is rotatably supported adjacent the gear reduction unit so that a gear fixedly carried by the cylindrical shaft is driven thereby. The connector provides structure at the end of the cylindrical shaft and the shank of the output shaft provides a collar having structure complementary to the cylindrical shaft structure for cooperative engagement. The collar is disposed between the ends of the output shaft and cooperative engagement of the complementary structures is obtained when one end of the shank is received through the cylindrical shaft.

Various forms or styles of structure are carried by the other end of the shaft for providing differing mountings of members to be driven with the output shaft. Thus, the other end of the shank may be threaded, cross-drilled, flatted, knurled, round, of cam outline, to name a few.

The one end of the shank may include an annular cut-out for receipt of a locking clip to maintain the assembled relation of the output shaft and connector yet permit removal of the output shaft from the connector.

The above mentioned and other features and objects of this invention and the manner of attaining them will become more apparent, and the invention itself will be better understood by reference to the following description of the preferred embodiment of the invention taken in conjunction with the accompanying drawings.

DESCRIPTION OF THE DRRAWING FIGURES

FIG. 1 is a perspective view of a modular assembly including a speed reduction unit and a prime mover in the mounted disposition;

FIG. 2 is a perspective view of the speed reduction unit having a substantial portion of the base plate broken away and various parts in section for purposes of better illustration of the structure;

FIG. 3 is a partial vertical section as seen along the line 3—3 in FIG. 2;

FIG. 4 is a perspective view of one of many configurations of output shaft suitable for use with the invention and a coupling member for coupling the shaft to a gear train; and FIGS. 5–8 are perspective views of further configurations of output shafts which may be employed.

DESCRIPTION OF THE PREFERRED EMBODIMENT

The motor assembly 10 is illustrated to advantage in FIG. 1 wherein the various interchangeable modular components including a prime mover 12, a speed reduction unit 14, an output (drive) shaft 16 (see also FIG. 2) and a pair of detachable electrical leads 18 are mounted together in operative relation.

By the present invention modular components having specific characteristics may be so mounted to provide required operating capability. Thus, the assembly may include in combination a motor to meet specific voltage and frequency requirements, a speed reduction unit to meet output speed requirements by successive steps of reduction through first, second, third gears and so on, and an output shaft having structure to permit coupling of the last gear of the speed reduction unit to a driven mechanism. Additionally, electrical leads of any length, type or color and with any form or terminal connector are interchangeably received by the prime mover through spade terminals (not shown).

The prime mover may be of any convenient form such as of hysteresis synchronous design providing, for example, fast, positive unidirectional starts and constant torque from start up to synchronous speed. The particular features and operation of the prime mover do not comprise a specific aspect of the invention other than as included in the overall combination and are according to well-known principles of synchronous motors. Thus, only very briefly, a source of electrical energy is coupled by the leads 18 to an energizing winding for generation within winding and associated stator poles of an alternating magnetic field, the flux pattern of which is directed toward a rotor across an air gap whereby the rotor is driven through attraction and repulsion of the rotor poles to and from the stator poles. The rotor (not shown) conventionally is mounted fixedly to a shaft 20. The shaft may carry a pinion 22 or other desired form of output member to be driven by the rotor shaft.

The speed reduction unit 14 includes a housing or gear cup 24 which may be of any outline as desired. The housing as illustrated is pear-shaped and provides a top plate 26 which may be integral with or otherwise secured to the walls along one peripheral edge. The top plate carries structure (not shown) for cooperative, releasable securement with structure (not shown) carried by the housing of the prime mover thereby to mount releasably the gear reduction unit and the prime mover together. Structure for this purpose and for mounting the components in one of several relative positions is well-known in the prior art. A bottom plate 28 is received by the housing at the other peripheral edge of the wall to enclose a gear train. The gear train denoted generally by the numeral 30 may be set up in any desired arrangement and with any desired number of reduction stages and may include components such as clutches, friction members, to name a few thereby to obtain any desired operation and ratio of speed reduction. To this end, for example, the gear train may provide a range of output speed of from one revolution per month to 900 revolutions per minute.

Mounting studs 32 in suitable number and arrangement are supported by one of the plates 26, 28 to extend toward the other plate,. Preferably, the mounting studs are supported by the bottom plate such as by permanently pressing the mounting studs into openings in the plate whereby the mounting studs all extend in parallel disposition. The mounting studs may be of steel to resist bending and flexing and highly polished to reduce friction, both in initial starting and subsequent movement of the gears or other components mounted thereon. The mounting studs extend to a disposition adjacent the top plate to confine the gears and components of the gear train in the housing.

A pair of openings 34 and 36 are formed in the top plate 26. The opening 34 is disposed within the central portion of the plate; whereas the opening 36 is disposed within the neck portion of the plate. A bushing 38 is received within the opening 36 and provides a bearing cup area 40 for reasons as will become clear. An opening 42 is formed in the bottom plate. The opening 42 is located in aligned disposition with the opening 36 and similarly supports a bushing 44. In mounted disposition of the gear reduction unit on the prime mover the shaft 20 will extend through opening 34.

As may be seen from the figures the mounting studs are located in an arrangement within the housing whereby an input gear 46 of the gear train 30 is in engagement with output pinion 22 of the prime mover on shaft 20 and an output gear 48 of the gear train is in engagement with a gear 50.

A stub shaft 52 mounts the gear 50 which may be integral with the shaft unit or else the gear 50 may be press fit or otherwise received on the shaft. To this end, the shaft may provide an enlarged knurled end 53. The stub shaft provides a central opening and is disposed with one end received within the bearing cup 40 of bushing 38. The other or knurled end of the stub shaft extends slightly into the opening of bushing 44 thereby to stabilize the stub shaft and assure exact alignment with the output shaft 16 to facilitate assembly. This other end of the stub shaft includes structure in the form of one or more fingers 54. The fingers extend longitudinally of the annulus of the knurled end.

The invention envisions the use of an output shaft 16 which may be received by, locked in the gear reduction unit 14 and removed from the gear reduction unit to be replaced by a further output shaft. Various forms of output shaft may be seen to advantage in FIGS. 4–8 of the drawings and are identified by the numerals 16a, 16b . . . and 16e, respectively. Each output shaft is formed with an elongated shank and when received through the stub shaft 52 extends between a position longitudinally displaced from the bushing 44 to a position longitudinally displaced although closely adjacent the bushing 38. A connector 56 is mounted on the shank of each output shaft as, for example, by telescoping the connector over the shank into a press fit within a knurled area 58 along the shank between the ends. FIGS. 5-8 illustrate the connector 56 in the mounted position; whereas, in FIG. 4 the connector is illustrated in position prior to being mounted.

One or more slots 60 are provided in each connector. The number of slots will be equal to the number of fingers extending from the stub shaft so that the parts are drivingly coupled together by the receipt of a finger into a slot.

An annular cut-out 62 is formed in the shank within the region adjacent the bushing 38. A clip 64 is received within the cut-out to releasably prevent retraction of the output shaft 16 from the stub shaft 52 and maintain coupled relation with the stub shaft 52. The length of the shank of each output shaft of FIGS. 4–8 between the position of connector 56 and the annular cut-out 62 is uniform so that for any output shaft the cut-out resides immediately below the bushing. The external diameter of the shank throughout this length is chosen for receipt through the central opening of the stub shaft and may be less than the diameter of the shank of the output shaft above the connector. The length of the shank above the connector may vary for different applications and each output shaft within this length may be of different style form for different cooperative connections of the output shaft with a driven member. The structure of FIG. 4 is illustrated as a simple round; the structure of FIG. 5 is cross-drilled; the structure of FIG. 6 is threaded (either with a left hand or right hand thread); the structure of FIG. 7 is provided with a flatted face; and, the structure of FIG. 8 provides a knurled area. Other styles providing a cam face, as an example, are possible, also.

The output shaft 16 may be formed of any suitable material such as cold rolled steel heat treated to a minimum hardness (Rockwell C-scale) of 32. The gears and other structure comprising the gear train 30 may be of any suitable material for the purposes desired. For example, the individual gears utilized may be formed of TEFLON and fiberglass-filled nylon, a material which meets industry standards for load, wear, speed, accuracy, quietness, shock and backlash allowance. The busings are formed of a suitable bearing material such as brass and the housing components may be formed of steel.

From the above, one may readily appreciate that numerous operational objectives are attainable by the use of different ones of the modular components and through the unique output shaft of varying style which may be received by, locked-in and removed from the gear reduction unit for replacement in the motor assembly will offer both increased performance advantages and will be useful in various applications. To this end, the motor assembly may have applications in the area of computer peripherals, instrumentation, office machinery, and vending machines, each of which may have different requirements for connection to an output shaft.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

What is claimed is:
1. In combination:
  a. a prime mover including
    1. an output pinion,
  b. means for connecting a source of power to said prime mover for driving said output pinion;
  c. a drive train including at least
    1. an output gear and
    2. an input gear, said input drive train gear connected to said output pinion to be driven by said output pinion;
  d. an output shaft including
    1. an elongated shank and
    2. means within one end region of said shank adapted to cooperate with complementary means on a member to drive said member by said output shaft; and
  e. connector means for releasably supporting said output shaft and coupling said output shaft to said output drive train gear.
2. The combination of claim 1 wherein
  e. said connector means includes
    1. a cylindrical shaft,
    2. a gear, said gear being fixed on said cylindrical shaft between its ends,
    3. a collar, said collar being fixed on said shank between its ends,
    4. means on said cylindrical shaft at one end, and
    5. complementary means on said collar, said cylindrical shaft and collar means adapted to cooperate in coupling relation when the other end region of said shank is received through said cylindrical shaft; and
  f. means for supporting said output shaft and cylindrical shaft in disposition whereby said cylindrical shaft gear is drivingly engaged by said output drive train gear.
3. The combination of claim 2 wherein
  f. said supporting means includes
    1. a housing,
    2. a pair of openings in said housing, said openings being disposed in coaxial relation, and
    3. bearing means supported in each opening, said cylindrical shaft being rotatably supported by at least one of said bearing means and said output shaft extending through both bearing means.
4. The combination of claim 3 further including
  g. locking means for releasably locking said output shaft in coupled relation with said cylindrical shaft, said locking means including
    1. an annular cut-out formed within said other end region of said shank adjacent said at least one bearing means, and
    2. a clip adapted for receipt in said cut-out to prevent removal of said other end region through said cylindrical shaft.
5. The combination of claim 2 wherein said means on one of said cylindrical shaft end and collar is formed by at least one extending finger and said means on said other of said cylindrical shaft end and collar is formed by a like number of slots for receipt therein of each of said fingers.
6. A rotatable member comprising
  a. an elongated shank,
  b. connector means, said connector means carried by said shank between its ends, said connector means adapted for releasably coupling said rotatable member to a source of rotary motion, and
  c. means carried by said shank within one end region adapted for cooperating with complementary means carried by a member to be driven by said rotatable member.
7. The rotatable member of claim 6 wherein
  b. said connector means includes
    1. a collar carried by said shank, and said source of rotary motion comprising a cylindrical shaft through which said opposite end region extends, one of said collar and cylindrical shaft including at least one extending finger and the other of said collar and cylindrical shaft including a like number of slots for receipt therein of each of said extending fingers.
8. The rotatable member of claim 6 wherein
  c. said shank means comprises a surface thread along at least a portion of said one end region.
9. The rotatable member of claim 6 wherein
  d. said shank means comprises a cross-drilled opening through said one end region.
10. The rotatable member of claim 6 wherein
  c. said shank means comprises a flatted surface along at least a portion of said one end region.
11. The rotatable member of claim 6 wherein
  c. said shank means comprises a plurality of knurls extending longitudinally along at least a portion of said one end region.
12. The rotatable member of claim 6 further comprising
  d. an annular cut-out, said annular cut-out formed within the other end region and adapted to receive a locking clip whereby said rotatable member may be secured in coupled relation to said source of rotary motion.
13. The rotatable member of claim 12 further comprising
  e. a clip, said clip adapted for receipt by said annular cut-out thereby to secure said opposite end region in disposition within said cylindrical shaft.

* * * * *